United States Patent [19]

Tazawa et al.

[11] Patent Number: 4,641,071
[45] Date of Patent: Feb. 3, 1987

[54] SYSTEM FOR CONTROLLING DRIVE OF A WAFER STAGE

[75] Inventors: Shigemoto Tazawa, Yokohama; Naoki Ayata, Machida, both of Japan

[73] Assignee: Canon Kabushiki Kaisha, Tokyo, Japan

[21] Appl. No.: 780,034

[22] Filed: Sep. 25, 1985

[30] FOREIGN APPLICATION PRIORITY DATA

Oct. 1, 1984 [JP] Japan .............................. 59-204068
Oct. 1, 1984 [JP] Japan .............................. 59-204069
Oct. 1, 1984 [JP] Japan .............................. 59-204070
Oct. 1, 1984 [JP] Japan .............................. 59-204071
Oct. 1, 1984 [JP] Japan .............................. 59-204072

[51] Int. Cl.$^4$ ............................................. G05B 1/06
[52] U.S. Cl. .................................... 318/640; 318/561; 318/594
[58] Field of Search ....................... 318/640, 594, 561

[56] References Cited

U.S. PATENT DOCUMENTS 4,223,257  9/1980  Miller .................................. 318/594
4,535,277  8/1985  Kurakake ........................... 318/561

Primary Examiner—William M. Shoop, Jr.
Assistant Examiner—Saul M. Bergmann
Attorney, Agent, or Firm—Fitzpatrick, Cella, Harper & Scinto

[57] ABSTRACT

A system for controlling drive of a movable member for carrying a workpiece such as a semiconductor wafer, the system including a first servo control system effective to move the workpiece carrying member at a relatively high speed and with a relatively low positional accuracy for stoppage of the workpiece carrying member, a second servo control system effective to move the workpiece carrying member at a relatively low speed and with a relatively high positional accuracy for the stoppage of the workpiece carrying member, and a system for selecting one of or a combination of the first and second servo control system in accordance with a positional accuracy required with respect to a target position of the workpiece carrying member.

38 Claims, 11 Drawing Figures

SYSTEM FOR CONTROLLING DRIVE OF A WAFER STAGE

FIELD OF THE INVENTION AND RELATED ART

This invention relates to a system for controlling drive of a workpiece carrying member. More particularly, the invention is concerned with a system for controlling drive of a wafer stage of an exposure apparatus for manufacturing integrated circuits, in which apparatus a semiconductor wafer is subjected to various processes while being moved by the wafer stage (X-Y stage).

Usually, integrated circuit manufacturing exposure apparatuses, more particularly step-and-repeat type exposure apparatuses, include a combination of two servo systems, a speed controlling servo system and a position controlling servo system, in order to control drive of an X-Y stage for carrying and moving a semiconductor wafer. As is well known in the art, the speed controlling servo system is effective to move an object to put it in a desired position at a higher speed and thus in reduced time, but the positional accuracy for the stoppage to place the object at the desired position is not so high. On the other hand, the position controlling servo system is effective to move an object to put it in a desired position with a higher accuracy, but the moving speed of the object is not so high.

FIG. 1 shows an example of wafer stage movement controlled by the combination of such speed controlling servo system and position controlling servo system. The abscissa of FIG. 1 shows the time while the ordinate shows the moving speed (or position) of the wafer stage. In FIG. 1, the movement of the wafer stage is initiated at time t1 and, during a period SS from time t1 to time t4, the speed controlling servo system is operated to control the drive of the wafer stage, such that the wafer stage is moved at higher speeds. On the other hand, during a period PS from time t4 to time t5, following the period SS, the position controlling servo system is operated to control movement of the wafer stage, such that the wafer stage is moved at lower speeds.

In the period SS in which the speed controlling servo system is operated, the wafer stage is driven in accordance with the illustrated speed variation pattern of substantially trapezoidal shape having an acceleration portion A-B in which the moving speed of the wafer stage is increased at a constant acceleration, a steady speed portion B-C in which a constant speed Vmax is maintained and a deceleration portion C-D in which the moving speed is decreased at a constant deceleration. These linear portions A-B, B-C and C-D are determined in accordance with the difference between the target position (the stop position as desired) and the current position of the wafer stage at the time t1, i.e. the amount of displacement to be made. For example, an appropriate acceleration, an appropriate steady speed (maximum speed) and an appropriate deceleration in accordance with the amount of displacement to be made are read out from a table of a memory by a microcomputer. These data are specified as set values and, then, the set values are compared with outputs of a tachogenerator connected to a motor for driving the wafer stage. By this, the driving speed of the motor is servo controlled.

The position of the wafer stage is detected by a position detecting sytem such as an optical scale, a laser interferometer, etc.

The transition from the speed controlling servo mode to the position controlling servo mode is defined at the time the wafer stage reaches a predetermined position P1 which is short of the target position, e.g., by a distance 2 microns.

In the period PS in which the position controlling servo system is operated, the drive of the wafer stage is controlled so that the difference (i.e. the distance) between the target position and the current position of the wafer stage as detected by the position detecting system comes into a predetermined range, e.g. within 0.2 micron. This range is called as a tolerance for the positional accuracy of placing the stage at the desired position. The wafer stage is moved at lower speeds until the difference between the target position and the current position of the wafer stage comes into the tolerance and, when this is achieved, the control is terminatd (at point P2 in FIG. 1) and the movement of the wafer stage is stopped.

Of the time required for the control until the movement of the wafer stage is stopped, the time of the period PS in which the position controlling servo system is operated becomes longer with the narrower tolerance.

In conventional exposure apparatuses, the final portion of the movement of the wafer stage is always controlled by the position controlling servo system, independently from the kinds of target positions. Further, the same tolerance that is determined with respect to such a target position (stop position) which requires a highest positional accuracy for the stoppage of the wafer stage is fixedly set for all the other target positions of the wafer stage. Therefore, depending on the target positions, the movement of the wafer stage is controlled with a positional accuracy higher than necessary. This results in an obstacle to an improvement in the throughput of the integrated circuit manufacturing exposure apparatus.

For example, in the exposure apparatuses of the step-and-repeat type, what requires a highest positional accuracy for the stoppage of the wafer stage (X-Y stage) is the stepwise movement of the wafer stage for each of the exposure shots. Usually, a positional accuracy of an order of 0.1 micron is required. As compared therewith, only a positional accuracy of an order of 10 microns is sufficient for the stoppage of the wafer stage, in a case of movement to a wafer loading/unloading position in connection with a wafer auto-feeder or in a case of movement to a prealignment station for the sake of TV prealignment or TTL (Through-The-Lens) automatic alignment.

Controlling all the movements of the wafer stage by means of the position controlling servo system and with the same tolerance of 0.1 micron would require an unnecessarily prolonged time for the stoppage (positioning) of the wafer stage, depending on the kinds of the target positions.

Further, in conventional exposure apparatuses, the final portion of the movement of the wafer stage to a target position, in the wafer exposure process, is always controlled by the position controlling servo system, irrespective of whether the process which is going to be effected just after completion of the positioning of the wafer stage is a first-mask step (i.e. a first mask mode in which a circuit pattern of a first mask is to be printed onto a first layer of the wafer) or an alignment step for aligning the wafer with respect to a mask, other than the first mask, for the sake of accurately overlaying a pattern of that mask onto a circuit pattern or patterns which have already been transferred onto the wafer. In addition, the same tolerance that is determined with respect to the first-mask mode in which a highest positional accuracy is required for the stoppage of the wafer stage is set also for the stepwise movements in various steps other than the first-mask step. Therefore, in the alignment step which does not require a very high positional accuracy, the movement of the wafer stage is controlled with a positional accuracy higher than a necessary accuracy. This results in an obstacle to an improvement in the throughput of the exposure apparatus. For example, in the exposure apparatuses of step-and-repeat type and having an automatic TTL (Through-The-Lens) alignment function, what requires the highest positional accuracy for the stoppage of the wafer stage (X-Y stage) is the stepwise movement of the wafer stage for each of the exposure shots in the first-mask mode in which a wafer having been placed with respect to a reticle by a separate off-axis alignment system or the like is to be moved stepwise under the control of the position controlling servo system only. Usually, a positional accuracy of an order of 0.1 micron is required for the stoppage of the wafer stage. As compared therewith, only a positional accuracy of an order of 0.5–1.0 micron is sufficient in relation to the movement of the wafer stage for the sake of an alignment step for accurately overlaying, with use of alignment marks transferred onto the wafer during the preceding exposure step, a circuit pattern of a mask, other than the first mask, onto the pattern or patterns which have already been transferred onto the wafer. In the step-and-repeat type exposure apparatuses having a reduced imaging magnification, precise alignment between the mask and the wafer is attainable by minutely displacing the mask or reticle. In view of this, the positional accuracy of the stepwise movement of the wafer stage for the sake of the alignment step can be made relatively low.

Controlling all the movements of the wafer stage by means of the position controlling servo system and with the same tolerance of 0.1 micron would require an unnecessarily prolonged time for the stoppage (positioning) of the wafer stage, such as in a case of movement for the alignment step.

Additionally, in the conventional exposure apparatuses, the final portion of the movement of the wafer stage to a target position is controlled by the position controlling servo system in every one of the exposure steps, i.e. irrespective of whether the pattern which is going to be printed on the wafer is an aluminum wiring pattern or an actual circuit pattern. Also, the same tolerance that is determined with respect to the printing of the actual circuit pattern which requires a highest positional accuracy for the stoppage of the wafer stage is set also for the stepwise movement in all the other steps. Therefore, in the exposure step for printing the wiring pattern which does not require a very high positional accuracy, the movement of the wafer stage is controlled with a positional accuracy higher than necessary accuracy. This results in an obstacle to improvement of the throughput of the exposure apparatus.

For example, in the step-and-repeat type exposure apparatuses having an off-axis automatic alignment function, what requires a highest positional accuracy for the stoppage of the wafer stage (X-Y stage) is the stepwise movement for each of the exposure shots in the first-mask mode in which a wafer having been placed with respect to a mask or reticle by a separate off-axis alignment system is to be moved stepwise under the control of the position controlling servo system only. Usually, a positional accuracy of an order of 0.1 micron is required. As compared therewith, only a positional accuracy of an order of 0.5–1.0 micron is necessary with respect to the stepwise movement of the wafer stage for the sake of the wiring pattern printing step in which a relatively low alignment accuracy is required.

Controlling all the movements of the wafer stage by means of the position controlling servo system and with the same tolerance of 0.1 micron would require an unnecessarily prolonged time for the stoppage (positioning) of the wafer stage, depending on the kinds of the patterns to be printed.

SUMMARY OF THE INVENTION

It is accordingly a primary object of the present invention to provide a system for controlling drive of a workpiece carrying member, such as a wafer stage, by which a workpiece such as a wafer can be moved and placed at a desired position in a significantly reduced time and in accordance with a positional accuracy required.

It is another object of the present invention to provide a system for controlling the drive of a workpiece carrying member such as a wafer stage, in which a tolerance of a positional accuracy for stoppage of the workpiece carrying member can be variably set in accordance with the accuracy as required.

Briefly, according to the present invention, there is provided a system for controlling the drive of a movable member for carrying a workpiece such as a semiconductor wafer, the system including a first servo control system effective to move the workpiece carrying member at a relatively high speed and with a relatively low positional accuracy for stoppage of the workpiece carrying member, a second servo control system effective to move the workpiece carrying member at a relatively low speed and with a relatively high positional accuracy for the stoppage of the workpiece carrying member, and a system for selecting one of or a combination of the first and second servo control system in accordance with a positional accuracy required with respect to a target position of the workpiece carrying member.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 2:
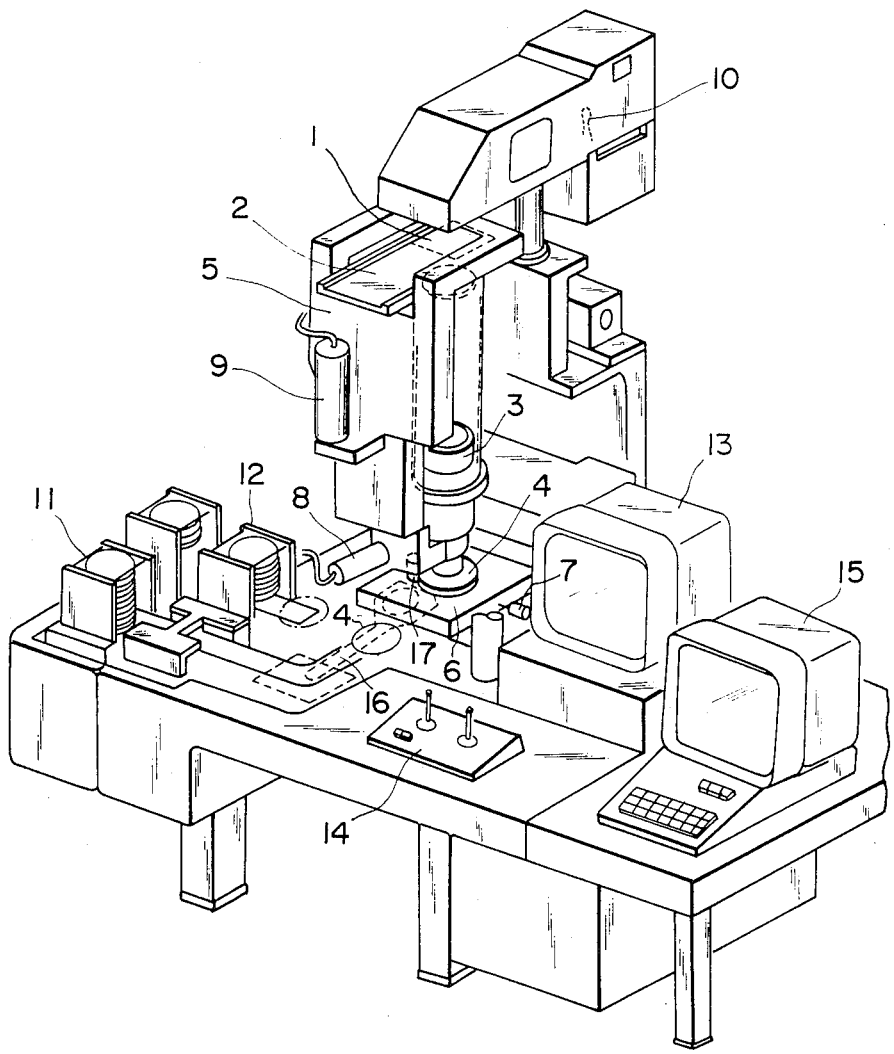
FIG. 2 is a schematic view of an integrated circuit manufacturing exposure apparatus of the step-and-repeat type in which a drive control system according to a first embodiment of the present invention is incorporated.

Referring now to FIG. 2, there is shown an integrated circuit manufacturing exposure apparatus of step-and-repeat type, in which a drive control system according to a first embodiment of the present invention is incorported.

In FIG. 2, a reticle 1 which is to be irradiated with a light from an exposure light source 10 is held by a reticle stage 2 disposed movably in a plane of X-Y orthogonal co-ordinates and rotatably about an axis perpendicular to the X-Y plane. The light incident on the reticle 2 and passed therethrough is directed by a projection lens 3 to a wafer 4 placed on a wafer stage 6, whereby a circuit pattern of the reticle 2 is projected onto the wafer 4. Annexed to this projection optical system is an alignment scope 5 provided for the sake of TTL alignment and observation. The alignment scope 5 is provided with an image pickup tube 9. Also annexed to the projection optical system is a TV prealignment system having an objective lens 17 and an image pickup tube 8. Denoted by numeral 11 is a wafer supply carrier for supplying wafers to the stage 6 in sequence. Denoted by numeral 12 is a wafer collection carrier for collecting the wafers from the stage 6 in sequence. The loading and unloading of the wafers onto and from the wafer stage, from and to these carriers, are performed at predetermined stage positions (loading and unloading positions) by means of a handler device 16. The apparatus further includes a CRT display 13 for selectively displaying one of picture images obtained from the image pickup tubes 17 and 8, an operation panel 14 having joysticks and various operation switches, and a console 15 for controlling the system. The wafer stage 6 (which will be referred to also as the "X-Y stage") is driven by a motor 7.

Figure 3:
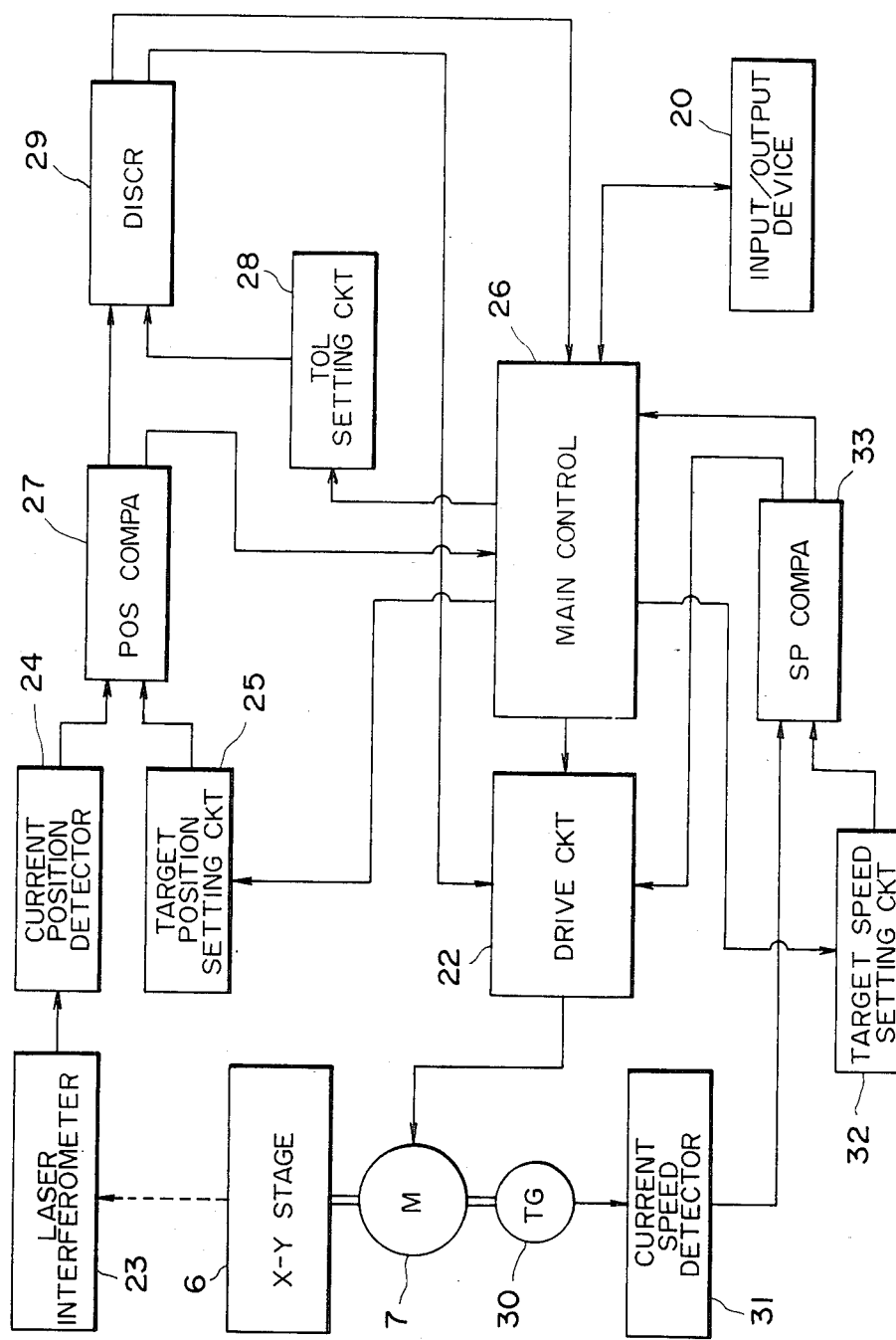
FIG. 3 is a block diagram showing a system for controlling the drive of a wafer stage of the exposure apparatus of FIG. 2, arranged in accordance with the first embodiment of the present invention.

FIG. 3 is a block diagram showing a control system for controlling the drive of the X-Y stage 6. As shown in FIG. 3, the system includes a laser interferometer 23 for detecting, with a high accuracy, the position of the X-Y stage 6 with respect to the X-Y co-ordinates, and a tachometer generator 30 (hereinafter the "tachogenerator") connected to the stage driving motor 7 to detect the moving speed of the X-Y stage 6.

The motor 7 is driven by a driving circuit 22, and the control mode of the driving circuit 22 is determined by a main control circuit 26 comprising a microprocessor and the like.

The drive control system includes a speed controlling servo system and a position controlling servo system. The speed controlling servo system is provided by a control loop comprising a current speed detector 31 for detecting outputs from the tachogenerator 30, a target speed setting circuit 32 for storing therein a target speed as specified by the main control circuit 26, and a speed comparator 33 for comparing the output of the detector 31 with the set value stored in the target speed setting circuit 32.

The position controlling servo system is provided by a control loop comprising a current position detector 24 for detecting the current position of the stage 6 on the basis of the output signals from the laser interferometer 23, a target position setting circuit 25 for storing therein a target position (a position to which the wafer stage 6 is to be displaced) as specified by the main control circuit 26, a position comparator 27 for comparing the output of the detector 24 with the output of the target position setting circuit 25 and for producing an output corresponding to the difference, a tolerance setting circuit 28 for providing an output corresponding to the tolerance as specified by the main control circuit 26, and a discriminator 29 for comparing the output of the comparator 27 with the output of the tolerance setting circuit 28 to discriminate the magnitude relation between these output signals. The discriminator 29 applies an output signal to the main control circuit 26 and also applies an output signal (an enabling signal or a disabling signal) to the driving circuit 22, so as to cause the driving circuit 22 to drive the motor 7 at lower speeds until the result of discrimination by the discriminator 29 shows that the level of the output from the position comparator 27 has reached a value within the tolerance.

Major functions of the main control circuit 26 of this embodiment of the present invention are as follows:

(1) To supply the driving circuit 22, on the basis of the output from the position comparator 27, with an instruction signal in accordance with either the position controlling mode or the speed controlling mode;

(2) To discriminate the operation mode of the wafer stage (i.e. whether the mode is the step-and-repeat operation mode, the first-mask mode or any other mode), to discriminate whether or not the target position of the wafer stage is one which requires a high positional accuracy, and to supply the driving circuit 22 with an instruction signal in accordance with either the position controlling mode or the speed controlling mode;

(3) To detect, on the basis of the output signal from the discriminator 29, whether or not the stage has come within the tolerance of the target position, and to stop the drive of the wafer stage when it comes within the tolerance;

(4) To control the driving circuit 22, on the basis of the output from the comparator 33, to control the drive of the motor 7 so that the output of the detector 31 becomes equal to the output of the setting circuit 32;

(5) To set a target value in each of the target position setting circuit 25 and the target speed setting circuit 32; and (6) To set a tolerance in the tolerance setting circuit 28, in accordance with the target position and/or the operation mode of the wafer stage (i.e. the stepwise movement, the wafer loading/unloading movement, the movement for the prealignment, etc.).

Referring back to FIG. 2, the sequence of the operation of the X-Y stage with respect to the conveyance of the wafer will now be described. The wafer 4 taken out from the supply carrier 11 is supplied by the handler device 16 to the stage 6 at the predetermined wafer loading position. Thereafter, the stage 6 is moved to a position below the objective lens 7 for the sake of TV prealignment, so that it is placed at the prealignment position. At this position, the prealignment is effected with the use of the TV prealignment monitor 13, while moving the stage 6 by a minute amount. Subsequently, the stage 6 is moved to a first shot position (the position at which a first shot area of the wafer 4 carried by the stage 6 is located within a viewfield of the projection lens 3). At this time, the next wafer is moved to the wafer loading position by the handler device 16. Upon completion of the wafer automatic alignment with respect to the first shot area, the exposure is effected so that the circuit pattern of the reticle 2 is printed on the first shot area of the wafer 4. Then, a similar automatic alignment operation and an exposure operation is effected relative to each of the remaining shot areas of the wafer 4, while moving the stage 6 in the step-and-repeat manner. After the exposures relative to a predetermined number of shot areas of the wafer 4 are completed, the wafer 4 is unloaded from the stage 6 at the predetermined wafer unloading position by the handler device 16 (or by a specific wafer unloading handler device), and the wafer 4 is stored in the collection carrier 12. At this time, the next wafer is supplied to the stage 6 and similar operations are repeatedly effected.

The control of the drive of the wafer stage for the sake of the above-described operations of the stage 6 will now be described with reference to FIG. 3.

Figure 1:
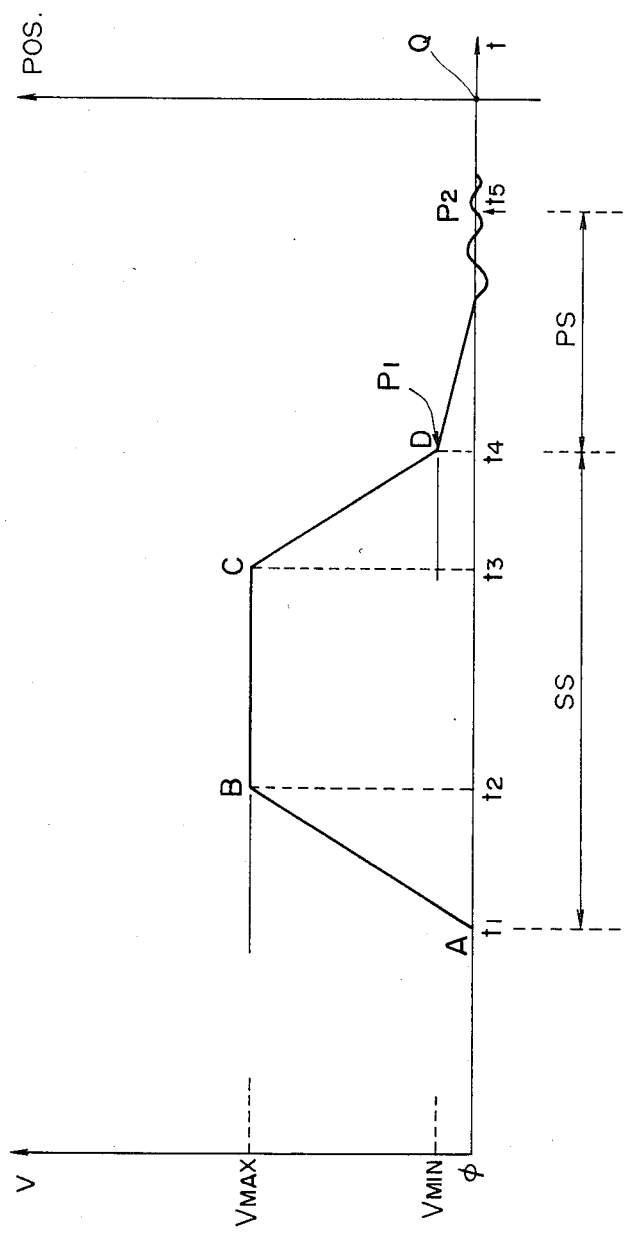
FIG. 1 is a graph showing an example of the movement of a wafer stage controlled by a combination of a speed controlling servo system and a position controlling servo system.

For the step-and-repeat operation or the first-mask mode, the main control circuit 26 specifies a target position (the shot position to which the stage 6 is to be moved) and sets the target position in the target position setting circuit 25. Simultaneously therewith, the main control circuit 26 supplies the driving circuit 22 with an instruction signal based on the speed controlling mode. After the movement of the X-Y stage 6 is initiated, the main control circuit 26 outputs, in accordance with an appropriate one of acceleration/deceleration tables prepared therein, set values designating a particular speed variation pattern of substantially trapezoidal shape such as, for example, shown in the period SS in FIG. 1. These set values are applied in sequence to the target speed setting circuit 32 at a constant timing. Then, in the speed comparator 33, the set values as applied to the target speed setting circuit 32 are compared in sequence with the outputs of the tachogenerator 30 as detected by the current speed detector 31, to thereby control the driving speed of the motor 7 by way of the driving circuit 22. During such operation of the speed controlling servo system, the outputs of the position comparator 27 are monitored by the main control circuit 26 and, when the output value of the position comparator 27 becomes equal to a predetermined set value, e.g. a value representing the position of 20 microns, the main control circuit 26 applies to the driving circuit 22 an instruction signal for effecting the position control in place of the speed control.

In the position control mode, the output of the position comparator 27 and the output of the tolerance setting circuit 28 are compared with each other in the discriminator 29.

If the magnitude of the output from the position comparator 27 is greater than that of the output from the tolerance setting circuit 28, the main control circuit 26 still acts on the driving circuit 22 to continue the position control. If, on the other hand, the magnitude of the output from the position comparator 27 becomes less than that of the output from the tolerance setting circuit 28, the discriminator 29 produces a positioning completion signal which is applied to the main control circuit 26. By this, an instruction signal for instructing stoppage of the motor 7 is applied to the driving circuit 22 and the control operation is terminated.

As compared therewith, the main control circuit 26 does not produce the signal for establishing the position control mode, for the case of movement of the wafer stage to the wafer loading/unloading position or the prealignment position and for the case of movement of the wafer stage in the alignment mode to accurately overlay a circuit pattern of a mask, other than the first mask, onto the pattern or patterns which have already been transferred onto the wafer. Therefore, fore, the drive and stoppage of such kinds of movements of the wafer stage are controlled only by the speed controlling servo system.

Figure 4:
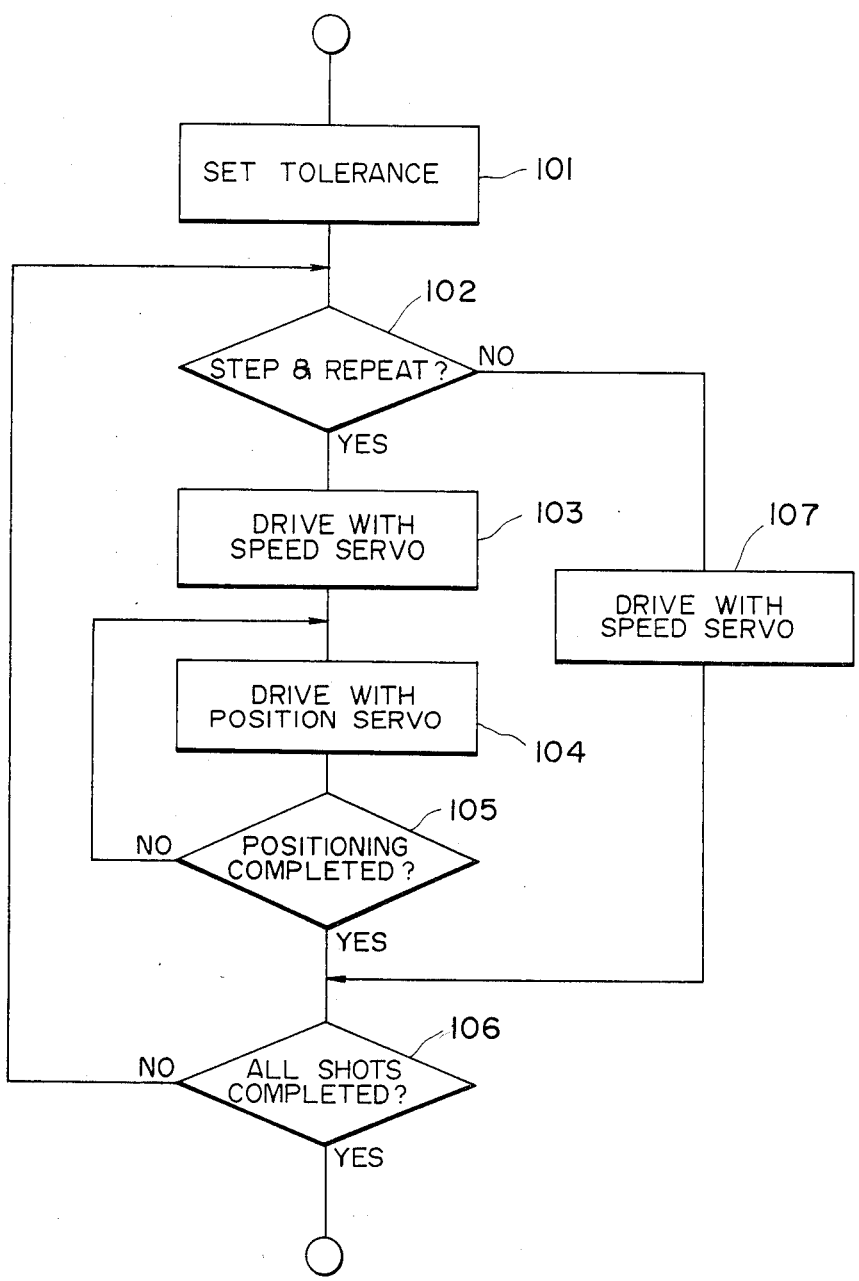
FIG. 4 is a flow chart showing the operation of the drive control system according to the first embodiment of the present invention.

FIG. 4 is a flow chart showing the operation of the drive control system according to this embodiment of the present invention.

First, at Step 101, an appropriate tolerance is set prior to initiation of the step-and-repeat operation of the X-Y stage. Then, at Step 102, whether or not the movement of the wafer stage is for the purpose of the step-and-repeat operation is discriminated. If it is so, the drive of the wafer stage is controlled by the speed controlling servo system (Step 103) and then by the position controlling servo system (Step 104). Subsequently, at step 105, whether or not the initially set tolerance is satisfied is discriminated. If it is satisfied, the movement of the stage is stopped to effect the exposure. Then, at Step 106, whether or not all the shots are completed is discriminated. If not completed, the sequence returns to Step 102 and similar opeations are repeated.

If the result of discrimination at Step 102 shows that the movement of the wafer stage is not for the step-and-repeat operation, then the sequence proceeds directly to Step 107, so that the drive of the wafer stage is controlled only by the speed controlling servo system.

With the sequence of the drive control system of this embodiment, an appropriate one of two different controlling manners can be selected in accordance with the positional accuracy determined by the operation mode of the wafer stage.

Next, a drive control system according to a second embodiment of the present invention will be decribed.

Figure 5:
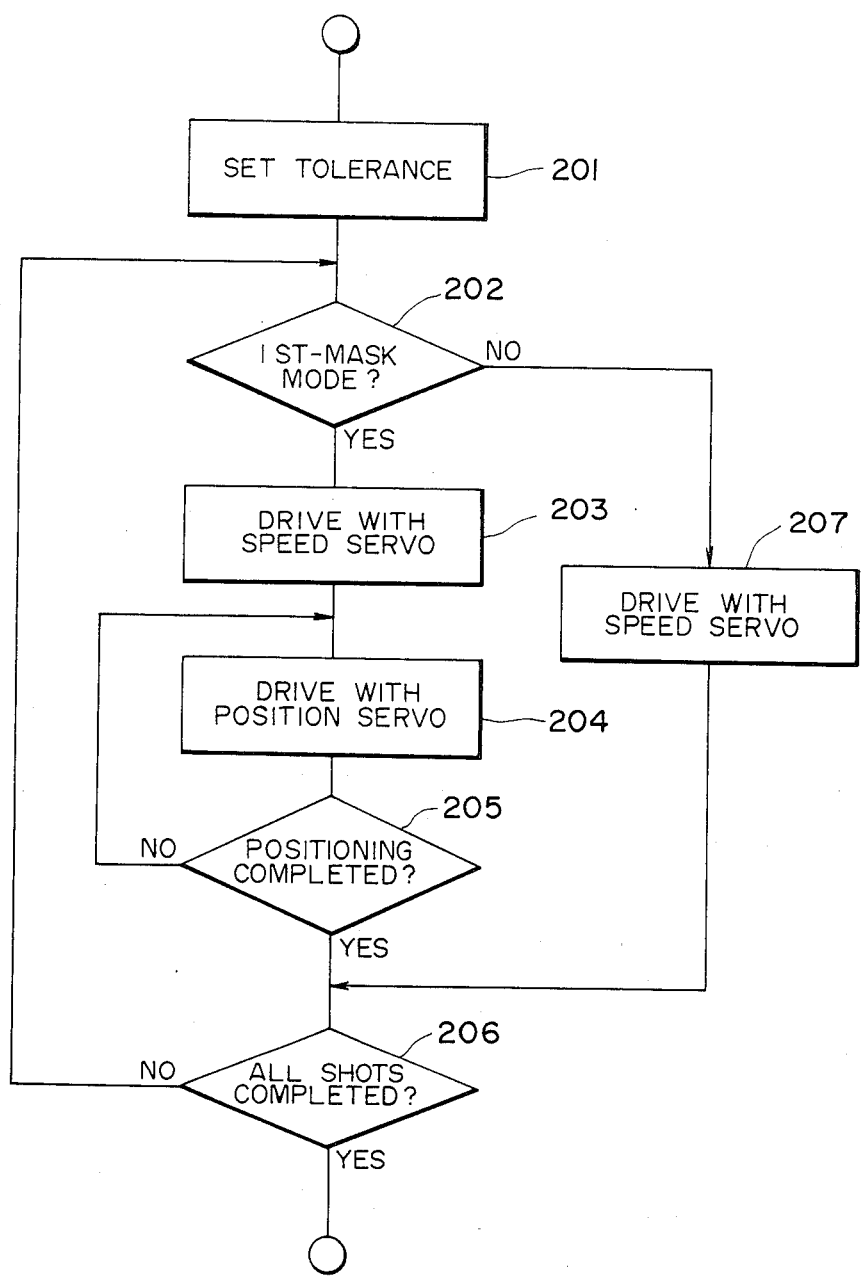
FIG. 5 is a flow chart showing an operation of a drive control system according to a second embodiment of the present invention.

The drive control system of this embodiment has a structure substantially the same as that of the first embodiment shown in FIG. 3. The only distinctive feature of the present embodiment lies in a part of the functions of the main control circuit such as at 26 in FIG. 3. So, the drive control system of this embodiment will be described in respect to the operation thereof. FIG. 5 is a flow chart showing the operation of this embodiment. First, at Step 201, an appropriate tolerance is set prior to the initiation of the step-and-repeat operation of the X-Y stage. Then, at Step 202, whether or not the movement of the X-Y stage is for the sake of the first-mask mode is discriminated. If it is for the first-mask mode, then the sequence proceeds to Step 203 and thereafter to Step 204, whereby the drive of the X-Y stage is controlled first by the speed controlling servo system and then by the position controlling servo system. Subsequently, at Step 205, whether or not the initially set tolerance is satisfied is discriminated. If it is satisfied, the drive of the stage is stopped in order to effect the exposure. Then, at Step 206, whether or not all the shots are completed is discriminated. If not completed, the sequence returns to Step 202 so that similar operations are effected again.

If the result of discrimination at Step 202 shows that the movement of the stage is not for the first-mask mode, then, the sequence proceeds directly to Step 207, such that the drive of the stage is controlled only by the speed controlling servo system.

With the sequence of the drive control system of this embodiment, an appropriate one of two different controlling manners can be selected. This is based on the fact that the tolerance of the positional accuracy for the stoppage of the stage is different depending on the exposure steps.

Now, a drive control system according to a third embodiment of the present invention will be described.

The drive control system of this embodiment has a structure substantially the same as that of the first embodiment shown in FIG. 3. So, description of the present embodiment will be made chiefly on the distinctive features thereof.

The drive control system of this embodiment includes a main control circuit such as shown at 26 in FIG. 3. Major functions of this main control circuit of this embodiment are as follows:

(1) To supply the driving circuit 22, on the basis of the output from the position comparator 27, with an instruction signal in accordance with either the position controlling mode or the speed controlling mode;

(2) To detect, on the basis of the output signal from the discriminator 29, whether or not the stage has come within the tolerance of the target position, and to stop the drive of the wafer stage when it comes within the tolerance;

(3) To control the driving circuit 22, on the basis of the output from the comparator 33, to control the drive of the motor 7 so that the output of the detector 31 becomes equal to the output of the setting circuit 32;

(4) To set a target value in each of the target position setting circuit 25 and the target speed setting circuit 32; and (5) To set a tolerance in the tolerance setting circuit 28, in accordance with the target position and/or the operation mode of the wafer stage (i.e. the stepwise movement, the wafer loading/unloading movement, the movement for the prealignment, etc.).

Since the structure of this embodiment is substantially the same as that of the first embodiment, a description of the operation of this embodiment will first be made on the basis of the disclosure of FIG. 3. For the step-and-repeat operation of the stage 6, the main control circuit 26 specifies a target position (the shot position to which the stage 6 is to be moved) and sets the target position in the target position setting circuit 25. Simultaneously therewith, the main control circuit 26 supplies the driving circuit 22 with an instruction signal based on the speed controlling mode. After the movement of the X-Y stage 6 is initiated, the main control circuit 26 outputs, in accordance with an appropriate one of acceleration/deceleration tables prepared therein, set values designating a particular speed variation pattern of substantially trapezoidal shape such as, for example, shown in the period SS in FIG. 1. These set values are applied in sequence to the target speed setting circuit 32 at a constant timing. Then, in the speed comparator 33, the set values as applied to the target speed setting circuit 32 are compared in sequence with the outputs of the tachogenerator 30 as detected by the current speed detector 31, to thereby control the driving speed of the motor 7 by way of the driving circuit 22. During such operation of the speed controlling servo system, the outputs of the position comparator 27 are monitored by the main control circuit 26 and, when the output value of the position comparator 27 becomes equal to a predetermined set value, e.g. a value representing the position of 20 microns, the main control circuit 26 applies to the driving circuit 22 an instruction signal for effecting the position control in place of the speed control.

In the position control mode, the output of the position comparator 27 and the output of the tolerance setting circuit 28 are compared with each other in the discriminator 29. In this case, a tolerance of 0.1 micron, for example, has been inputted to the tolerance setting circuit 28 from the main control circuit 26.

If the magnitude of the output from the position comparator 27 is greater than that of the output from the tolerance setting circuit 28, the main control circuit 26 still acts on the driving circuit 22 to continue the position control. If, on the other hand, the magnitude of the output from the position comparator 27 becomes less than that of the output from the tolerance setting circuit 28, the discriminator 29 produces a positioning completion signal which is applied to the main control circuit 26. By this, an instruction signal for instructing stoppage of the motor 7 is applied to the driving circuit 22 and the control operation is terminated.

On the other hand, the main control circuit 26 applies a signal to the tolerance setting circuit 28 to set therein a tolerance of 10 microns, for example, for the sake of movement of the wafer stage to the wafer loading/unloading position or the prealignment position. Except for this, the manner of control is the same as that described above.

Figure 6B:
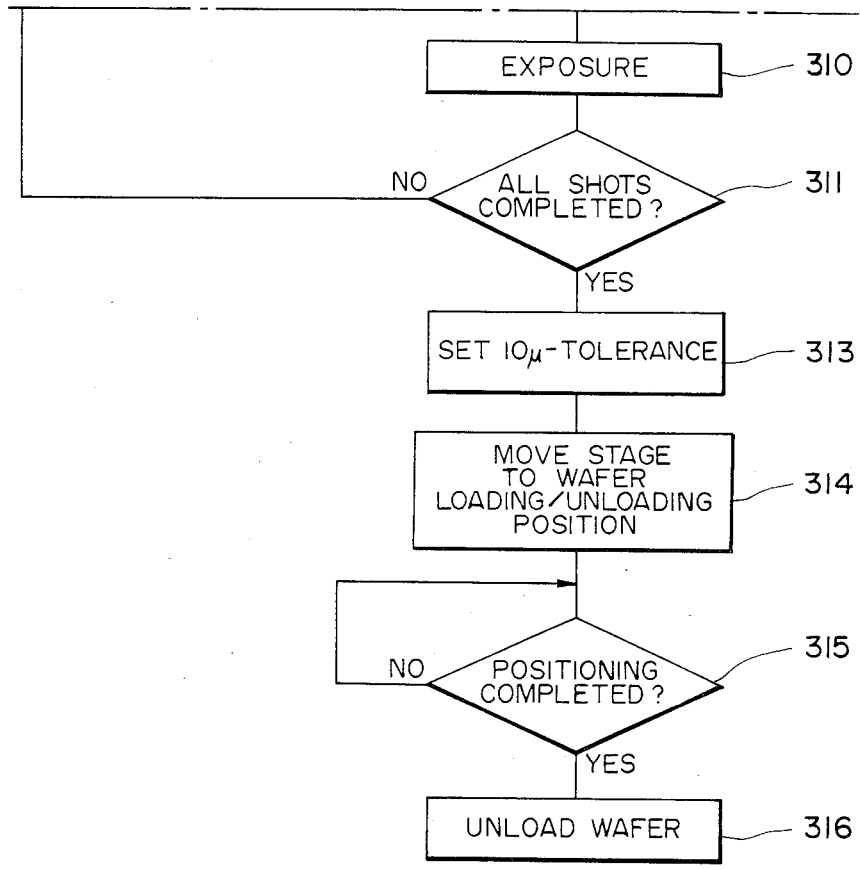
FIG. 6 is a flow chart showing an operation of a drive control system according to a third embodiment of the present invention.
Figure 6:
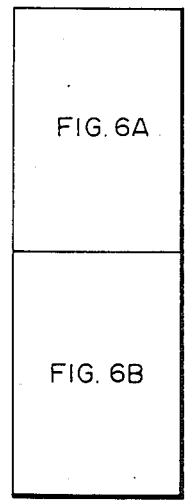
Figure 6A:
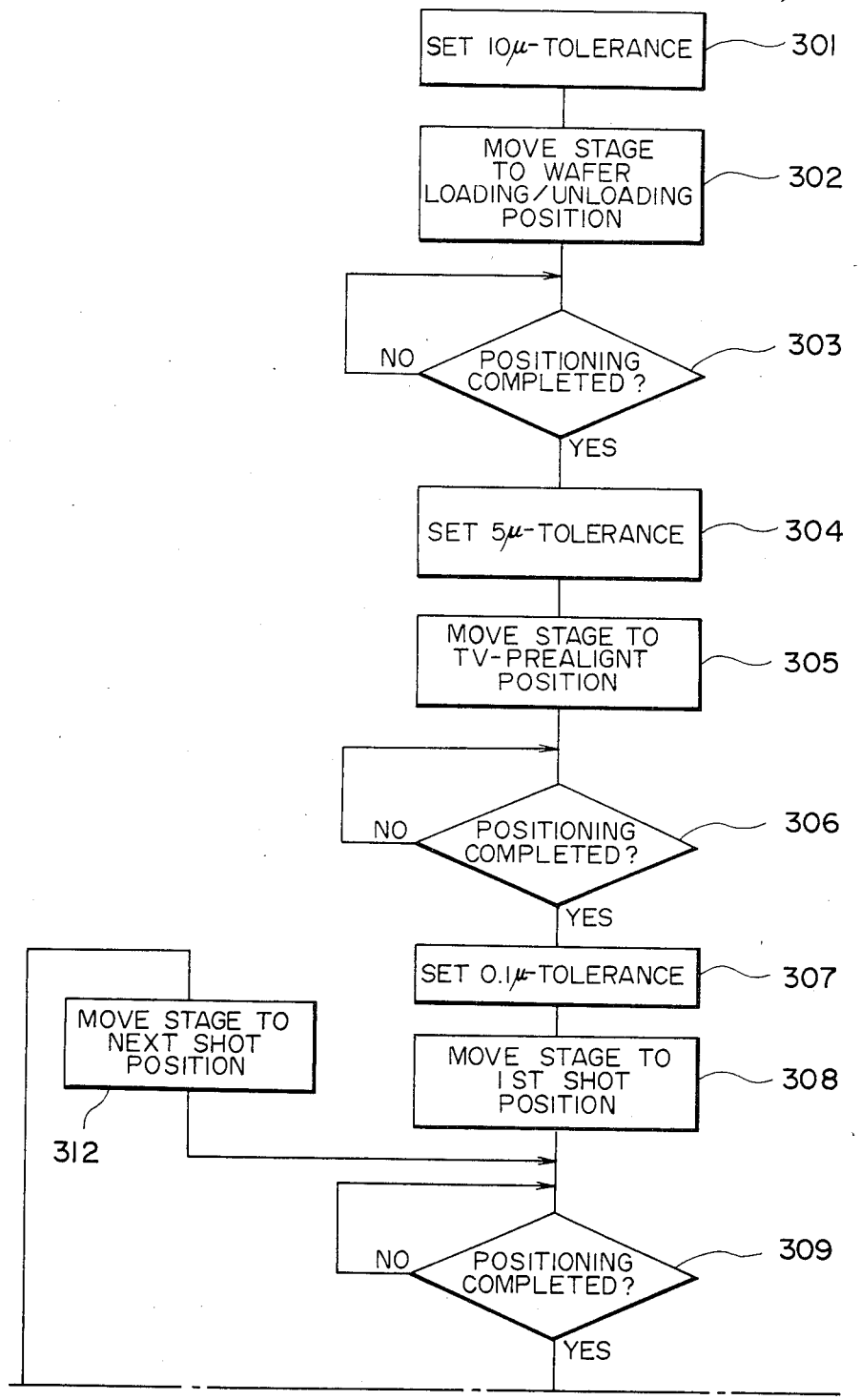

FIG. 6 is a flow chart showing the operation of the drive control circuit of this embodiment, in which the tolerance of the positional accuracy for the stoppage of the stage is variably set.

First, at the time of power supply to the apparatus or at the time of wafer collection, a tolerance of 10 microns is set (Step 301). Then, at Step 302, the stage is moved to the wafer loading/unloading position. During the final part of this movement, whether or not the tolerance of 10 microns is satisfied is discriminated (Step 303). If the tolerance is satisfied, then the wafer is placed on the stage. Thereafter, another tolerance of 5 microns is newly set in place of the tolerance of 10 microns (Step 304). Then, at Step 305, the stage is moved to move the wafer to the TV prealignment position. During the final portion of this movement, whether or not the tolerance of 5 microns is satisfied is discriminated (Step 306). If the tolerance is satisfied, then another tolerance of 0.1 micron is newly set in place of the 5-micron tolerance (Step 307). At Step 308, the stage is moved to move the wafer to the first shot position. Similarly, in this movement, whether or not the tolerance of 0.1 micron is satisfied is discriminated at Step 309. If the tolerance is satisfied, then the exposure operation is effected (Step 310). After completion of the exposure operation, the number of shots is discriminated at Step 311. If all of the predetermined number of shots are not completed, the sequence proceeds to Step 312 whereby the wafer is moved to the next shot position. In this manner, movement of the stage for moving the wafer to each of the remaining shot positions and the exposure operation for each of the remaining shot areas are repeated, while maintaining the tolerance of 0.1 micron. When the exposure of one complete wafer is finished by completing all the predetermined number of shots, the sequence proceeds to Step 313 at which a tolerance of 10 microns is set again. Then, at Step 314, the stage is moved to the wafer loading/unloading position. During the final portion of this movement, whether or not the tolerance of 10 microns is satisfied is discriminated (Step 315). If the tolerance is satisfied, the wafer is collected by the handler device (Step 316) whereby one exposure step for one complete wafer is terminated.

Figure 7:
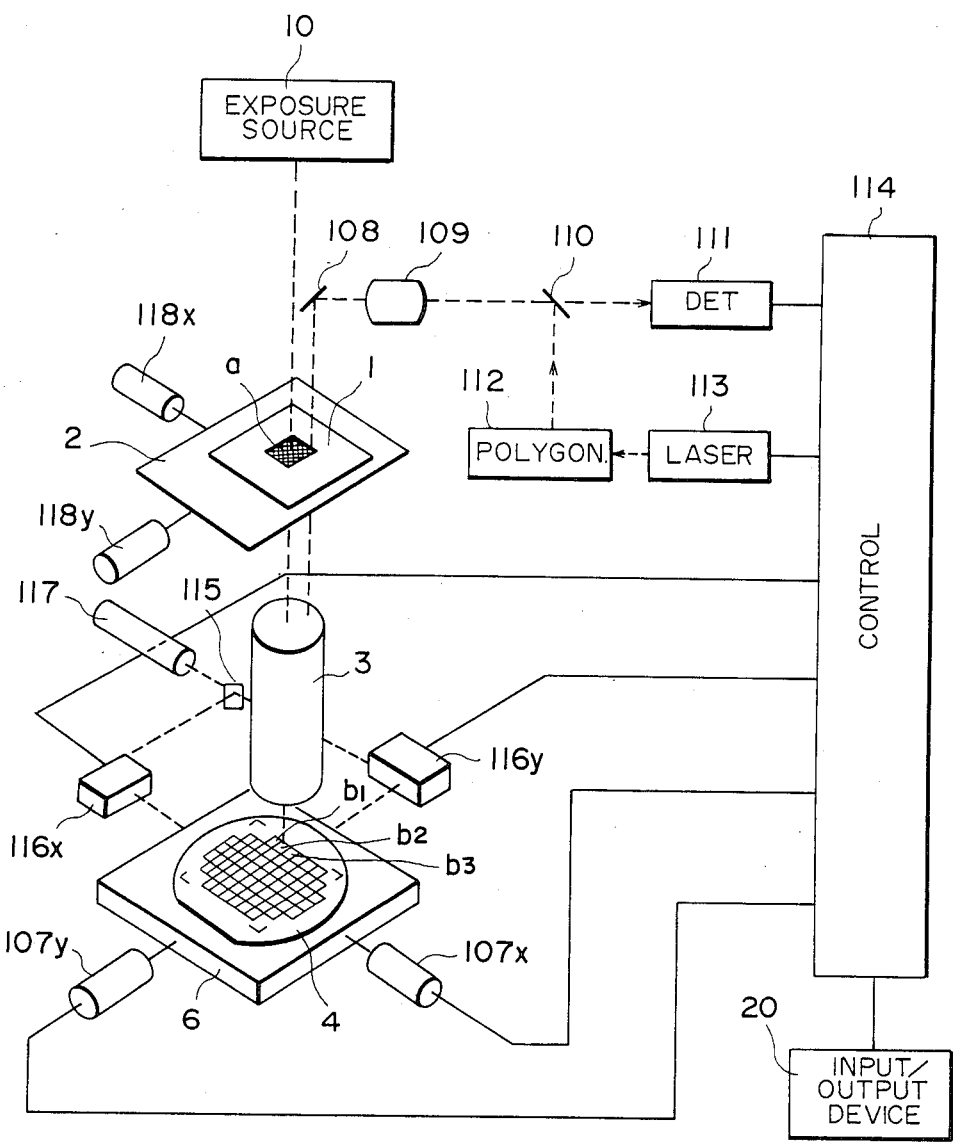
FIG. 7 is a schematic and diagrammatic view showing a major portion of a step-and-repeat type exposure apparatus having a TTL automatic alignment function, in which a drive control system according to a fourth embodiment of the present invention is incorporated.

Referring now to FIG. 7, there is shown a step-and-repeat type exposure apparatus having a TTL automatic alignment function, in which apparatus a drive control system according to a fourth embodiment of the present invention is incorporated.

As shown in FIG. 7, a reticle 1 which is to be irradiated by a light supplied from an exposure light source 10 is held by a reticle stage 2 disposed movably in a plane of an X-Y orthogonal co-ordinates and rotatably about an axis perpendicular to the X-Y plane. A circuit pattern a of the reticle 1 is projected by a projection lens 3 onto a surface of a wafer 4 held by a wafer stage 6, at a reduced imaging ratio of 1:5, for example. The wafer stage 6 is moved stepwise by controlling drives of an X-axis motor 107$x$ and a Y-axis motor 107$y$, respectively. By the stepwise movement of the wafer stage 6, the circuit pattern a of the reticle 1 is transferred onto areas b1, b2, b3, . . . and bn on the wafer surface at a reduced magnification.

Prior to the exposure of the wafer, the wafer and the reticle must be accurately aligned with each other. For this purpose, the exposure apparatus of this embodiment is provided with a TTL (Through-The-Lens) automatic alignment optical system. More specifically, a laser beam produced by a laser tube 113 is introduced into the projection lens 3 by way of a rotatable polygonal mirror 112, a half mirror 110, an objective lens 109 and a mirror 108. By rotating the polygonal mirror 112, alignment marks formed on the reticle 1 and alignment marks which have been transferred onto the wafer during the preceding exposure step are scanned with the laser beam. When these alignment marks are scanned with the laser beam, there occurs diffractively reflected light which is directed along its oncoming path to the half mirror 110 and to a photoelectric detector (or a TV camera) 111.

The exposure apparatus includes a control box 114 having a system for detecting, on the basis of an output signal from the photoelectric detector 111, the positional relation between the alignment marks of the wafer and the reticle, i.e. the positional relation between the wafer and the reticle, to thereby control driving devices 118$x$ and 118$y$ for moving the reticle stage 2 by a minute amount. The precise alignment between the wafer and the reticle attainable by such minute movement of the reticle stage 2 is effected prior to each of the exposures of the areas b1, b2, b3, . . . bn on the wafer surface.

On the other hand, the control of the stop position for the stepwise movement of the wafer stage 6 is carried out on the basis of the data on the position of the stage 6, with respect to the X-Y co-ordinates, as detected by a position measuring system including laser interferometers 116$x$ and 116$y$.

In FIG. 7, the laser interferometers 116$x$ and 116$y$ are adapted to detect the position of the wafer stage 6 with respect to the X-component and the Y-component in the moving direction of the stage 6. More specifically, a laser beam supplied from a laser tube 117 is introduced to the wafer stage 6 by way of a half mirror 115 and the laser interferometers 116$x$ and 116$y$. In response to the stepwise movement of the stage 6, each of the laser interferometers 116$x$ and 116$y$ produces position detecting pulses each of which is a distance signal. These pulses are counted by a control circuit in the control box 114, whereby the amount of displacement of the stage 6 is detected and, therefore, the current position of the wafer stage 6 with respect to the X-Y co-ordinates is detected accurately.

The resolution and linearity of the pulses from the laser interferometers 116$x$ and 116$y$ have sufficient accuracy (for example, 0.05 micron/one pulse) relative to the required alignment accuracy. Therefore, when the stage is to be moved so that another exposure area of the wafer is placed at the exposure position, the increasing amount of movement of the stage is accurately measured by the laser interferometers and the wafer stage 6 is moved until the measured amount of movement becomes exactly equal to the preset amount of movement.

It is possible that the adjustment of the position of the wafer stage for the wafer to reticle alignment does not assure a sufficient alignment accuracy. This is because of possible local distortion of the wafer due to the heat treatment of the wafer, the ion injection process, etc. Further, if the exposure of the wafer in the preceding pattern printing step has been carried out by an exposure apparatus of whole-surface exposure type, the printed pattern itself may contain distortion.

In view of the above, the reticle stage is preferably moved by a minute amount because it is very effective to more accurately align the reticle with the wafer in a projection exposure apparatus having a reduced imaging ratio. In such case, the positioning of the wafer stage does not require a very high accuracy, such that only a tolerance of 0.5-1.0 micron will be sufficient for the positional accuracy with respect to the stoppage of the wafer stage. The final correction of the position of the wafer stage 6 is achieved by relative minute movement of the reticle stage through the TTL alignment system and the accuracy thereof is very high. Usually, an accuracy of an order of 0.1 micron is assured.

During the first-mask mode, on the other hand, a strict accuracy is required for the positioning of the wafer stage 6, and an accuracy of an order of 0.1 micron must be assured only by controlling the drive of the wafer stage.

The drive control system according to the present embodiment has a structure substantially the same as that of the first embodiment shown in FIG. 3. Like the first embodiment, the drive control system of this embodiment includes a similar main control circuit such as shown at 26 in FIG. 3. Major functions of this main control circuit of the present embodiment are as follows:

(1) To supply the driving circuit 22, on the basis of the output from the position comparator 27, with an instruction signal in accordance with either the position controlling mode or the speed controlling mode;

(2) To detect, on the basis of the output signal from the discriminator 29, whether or not the stage has come within the tolerance of the target position, and to stop the drive of the wafer stage when it comes within the tolerance;

(3) To control the driving circuit 22, on the basis of the output from the comparator 33, to control the drive of the motor 7 so that the output of the detector 31 becomes equal to the output of the setting circuit 32;

(4) To set a target value in each of the target position setting circuit 25 and the target speed setting circuit 32; and (5) To set in the tolerance setting circuit 28 an appropriate tolerance in accordance with the necessary accuracy corresponding to the wafer exposure step which is going to be effected (this is one of the distinctive features of this embodiment).

As described, the structure of the drive control system of this embodiment is substantially the same as that of the first embodiment. So, description of the operation of the present embodiment will first be made on the basis of the disclosure of FIG. 3. The main control circuit such as shown at 26 in FIG. 3 is connected to an input/output device 20 having a CRT display, a keyboard, etc. By manually handling this input/output device 20, an operator manually inputs to the apparatus various data concerning the kind of operation such as the first-mask step, the alignment step, etc., the tolerance of the positional accuracy for the stoppage of the stage 6 and the like.

The control of the drive of the stage 6 for the exposure operation will be described. With regard to the step-and-repeat operation, the main control circuit 26 specifies a target position (the shot position to which the stage 6 is to be moved) and sets the target position in the target position setting circuit 25. Simultaneously therewith, the main control circuit 26 supplies the driving circuit 22 with an instruction signal based on the speed controlling mode. After the movement of the X-Y stage 6 is initiated, the main control circuit 26 outputs, in accordance with an appropriate one of acceleration/deceleration tables prepared therein, set values designating a particular speed variation pattern of substantially trapezoidal shape such as, for example, shown in the period SS in FIG. 1. These set values are applied in sequence to the target speed setting circuit 32 at a constant timing. Then, in the speed comparator 33, the set values as applied to the target speed setting circuit 32 are compared in sequence with the outputs of the tachogenerator 30 as detected by the current speed detector 31, to thereby control the driving speed of the motor 7 by way of the driving circuit 22. During such operation of the speed controlling servo system, the outputs of the position comparator 27 are monitored by the main control circuit 26 and, when the output value of the position comparator 27 becomes equal to a predetermined set value, e.g. a value representing the position of 20 microns, the main control circuit 26 applies to the driving circuit 22 an instruction signal for effecting the position control in place of the speed control.

In the position control mode, the output of the position comparator 27 and the output of the tolerance setting circuit 28 are compared with each other in the discriminator 29.

If the magnitude of the output from the position comparator 27 is greater than that of the output from the tolerance setting circuit 28, the main control circuit 26 still acts on the driving circuit 22 to continue the position control. If, on the other hand, the magnitude of the output from the position comparator 27 becomes less than that of the output from the tolerance setting circuit 28, the discriminator 29 produces a positioning completion signal which is applied to the main control circuit 26. By this, an instruction signal for instructing stoppage of the motor 7 is applied to the driving circuit 22 and the control operation is terminated.

In such case, the main control circuit 26 applies an instruction signal to the tolerance setting circuit 28 so as to set a strict tolerance of an order of 0.1 micron, for example, with respect to the first-mask mode, while it applies an instruction signal to the tolerance setting circuit 28 so as to set a relatively wide tolerance of an order of 0.5–1.0 micron, for example, with respect to the alignment step.

Figure 8:
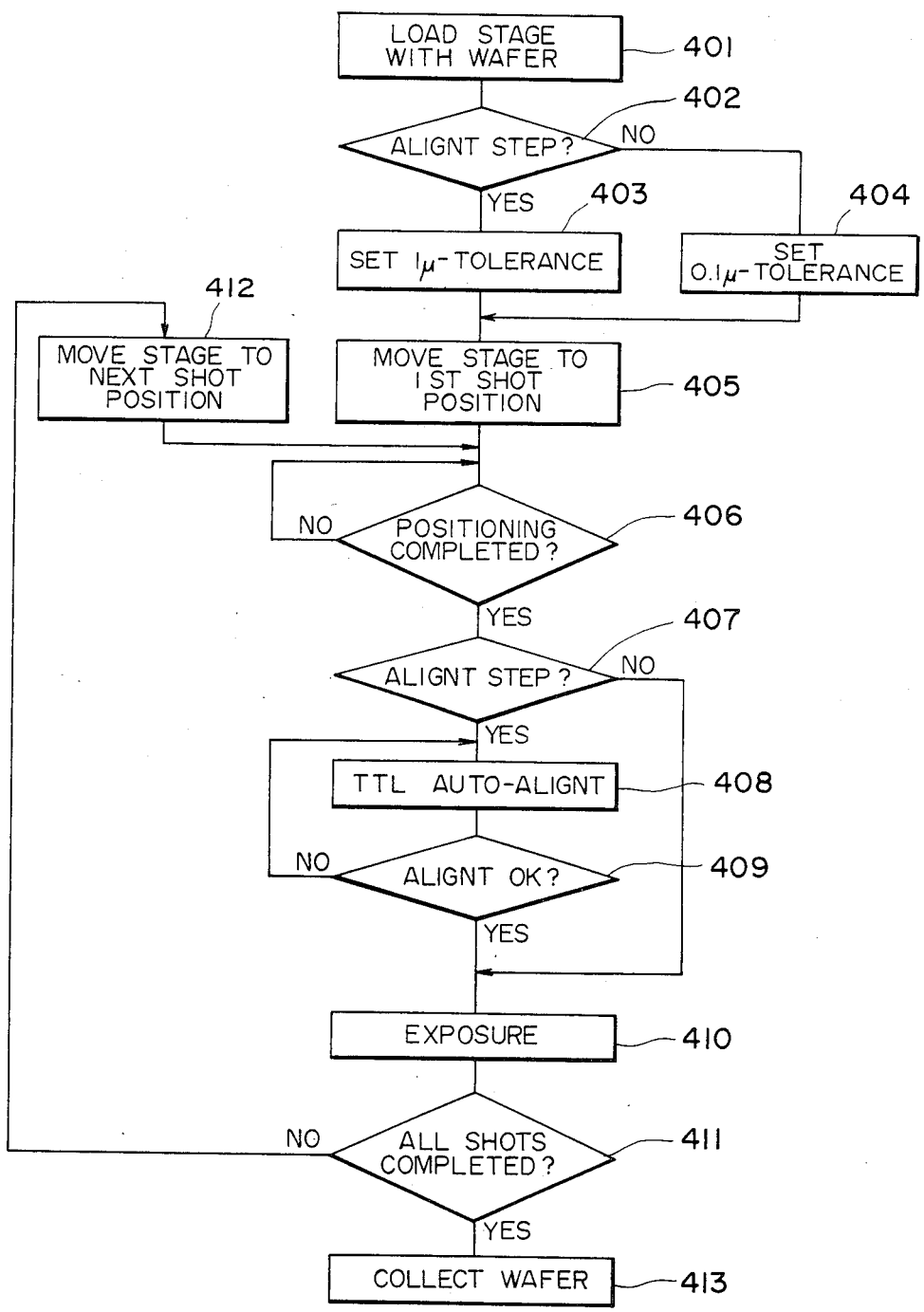
FIG. 8 is a flow chart showing the operation of the drive control system acording to the fourth embodiment of the invention.

FIG. 8 is a flow chart showing the operation of the drive control system according to this embodiment of the present invention, in which the positional accuracy for the stoppage of the stage is variably set by the main control circuit 26.

First, at Step 401, the wafer 4 is placed on the wafer stage 6. Then, at Step 402, the microprocessor contained in the main control circuit 16 discriminates the kind of the operation as specified in the input/output device 20, namely discriminates whether or not the designated operation is the alignment step. If the alignment step is designated, then the sequence proceeds to Step 403 so that the main control circuit 26 sets a tolerance of 1 micron in the tolerance setting circuit 28. If, on the other hand, the first-mask mode rather than the alignment step is designated, the sequence proceeds to Step 404 so that a tolerance of 0.1 micron is set. In any case, the sequence thereafter proceeds to Step 405 so that the wafer stage is moved to move the wafer 4 to the first shot position. Then, at Step 406, the position control following the speed control is continued until the position of the stage comes into the set tolerance. If it comes into the tolerance, the movement of the stage is stopped. After completion of this movement, whether or not the alignment operation has been designated is discriminated again at Step 407. If the alignment operation has been designated, then the sequence proceeds to Step 408 at which the TTL automatic alignment is carried out. Thereafter, at Step 409, whether or not the automatic alignment operation has actually decreased the positional deviation between the wafer 4 and the reticle 1 to a value not greater than the tolerance, e.g. 0.1 micron, as specified by the input/output device 20. If the positional deviation is still out of the tolerance, the sequence returns to Step 408 so that the operations are repeated in accordance with a loop defined by the Steps 409 and 408. If the positional deviation comes into the tolerance, the sequence proceeds to Step 410 so that the exposure of this shot is effected.

If, on the other hand, the result of discrimination at Step 407 shows that the first-mask mode has been designated, then the sequence proceeds directly to Step 410 to effect the exposure.

After completion of the exposure, the main control circuit 26 discriminates whether or not the exposures of all the shots of the wafer have been completed (Step 411). If not completed, the sequence proceeds to Step 412, whereby the stage is moved to the next shot position and the operations at Step 406 and the steps following Step 406 are repeated. Thus, the stage is operated in the step-and-repeat manner. The accuracy of the stepwise movement of the stage 6 at that time is the one as set at Step 403 or 404, so that the stage is positioned with an accuracy of an order of 0.1 micron in the case of the first-mask mode and with an accuracy of an order of not greater than 1 micron in the case of the alignment step.

Namely, in this embodiment of the present invention, a loose tolerance of 1 micron is set for the alignment step, in contrast to conventional drive control systems in which the same tolerance of 0.1 micron is fixedly established for the control of the stage movement in each of various operations. This effectively reduces the time required for moving and stopping the stage 6. For a distance 20 mm, for example, the necessary time is reduced from 0.3 sec. to 0.2 sec., that is by 0.1 sec. If one wafer contains 30–60 shots, then the throughput can be improved by approx. 3–6 sec. per one wafer. This is of great advantage to the manufacture of integrated circuits.

Referring back to FIG. 8, when the exposures of all the shots are completed, the sequence proceeds to Step 413 at which the stage 6 is moved to a predetermined wafer unloading position, so that the wafer is collected by an unshown handler device or the like.

Figure 9:
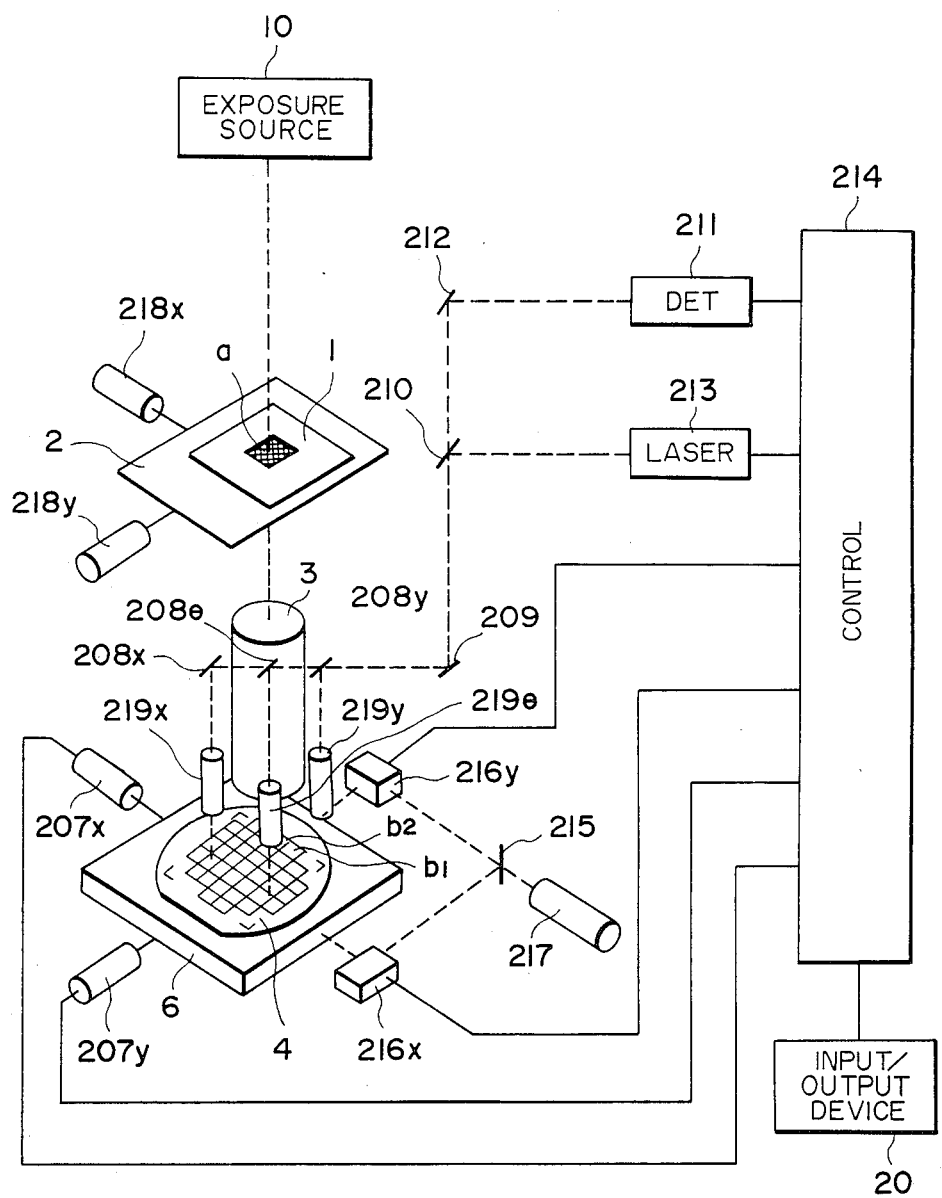
FIG. 9 is a schematic and diagrammatic view showing a major portion of a step-and-repeat type exposure apparatus having an off-axis automatic alignment function, in which a drive control system according to a fifth embodiment of the present invention is incorporated.

Referring now to FIG. 9, there is shown a step-and-repeat type exposure apparatus having an off-axis automatic alignment function, in which apparatus a drive control system according to a fifth embodiment of the present invention is incorporated.

As shown in FIG. 9, a reticle 1 which is to be irradiated by a light supplied from an exposure light source 10 is held by a reticle stage 2 disposed movably in a plane of an X-Y orthogonal co-ordinates and rotatably about an axis perpendicular to the X-Y plane. A circuit pattern a of the reticle 1 is projected by a projection lens 3 onto a surface of a wafer 4 held by a wafer stage 6, at a reduced imaging ratio of 1:5, for example. The wafer stage 6 is moved stepwise by controlling drives of an X-axis motor 207x and a Y-axis motor 207y, respectively. By the stepwise movement of the wafer stage 6, the circuit pattern a of the reticle 1 is transferred onto areas b1, b2, b3, . . . and bn on the wafer surface at a reduced magnification.

Prior to the exposure, the wafer and the reticle must be accurately aligned with each other. For this purpose, the exposure apparatus is provided with an off-axis automatic alignment optical system. More specifically, a laser beam supplied from a laser tube 213 is introduced into objective lenses 219x, 219y and 219θ by way of a half mirror 210, a mirror 209, half mirrors 208y, 208θ and a mirror 208x, such that alignment marks which have preparatively been formed on the wafer 4 in a predetermined manner are illuminated by the laser beams passed through the objective lenses, respectively. The laser beams reflected by the wafer 4 go back along their oncoming paths and are directed to a mirror 212 and to an image pickup tube 211, whereby images of the alignment marks are picked up by the image pickup tube 211. On the basis of the thus obtained images of the alignment marks, the position of the wafer 4 with respect to the optical axis of the projection lens 3 is detected. The exposure apparatus includes a control box 214 having a system for detecting, on the basis of a video output from the image pickup tube 211, the positional relation between the alignment marks of the wafer and the objective lens systems, i.e. the positional relation between the wafer 4 and the optical axis of the projection lens, to thereby control the drive of motors 207x and 207y for moving the wafer stage 6 and/or the drive of driving devices 218x and 218y for moving the reticle stage 2 by a minute amount. The precise alignment between the wafer and the reticle obtainable by minute movement of the reticle relative to the wafer is achieved prior to the exposure of a first area b1 on the wafer surface. The succeeding stepwise movement of the stage 6 is controlled by controlling the drive and stoppage of the wafer stage.

More specifically, the control of the stop position for the stepwise movement of the wafer stage 6 is carried out on the basis of the data on the position of the stage 6, with respect to the X-Y co-ordinates, as detected by a position measuring system including laser interferometers 216x and 216y.

In FIG. 9, the laser interferometers 216x and 216y are adapted to detect the position of the wafer stage 6 with respect to the X-component and the Y-component in the moving direction of the stage 6. More specifically, a laser beam supplied from a laser tube 217 is introduced to the wafer stage 6 by way of a half mirror 215 and the laser interferometers 216x and 216y. In response to the stepwise movement of the stage 6, each of the laser interferometers 216x and 216y produces position detecting pulses each of which is a distance signal. These pulses are counted by a control circuit in the control box 114, whereby the amount of displacement of the stage 6 is detected and, therefore, the current position of the wafer stage 6 with respect to the X-Y co-ordinates is detected accurately.

The resolution and linearity of the pulses from the laser interferometers 216x and 216y have sufficient accuracy (for example, 0.05 micron/one pulse) relative to the required alignment accuracy. Therefore, when the stage is to be moved so that another exposure area of the wafer is placed at the exposure position, the increasing amount of movement of the stage is accurately measured by the laser interferometers and the wafer stage 6 is moved until the measured amount of movement becomes exactly equal to the preset amount of movement.

Of the exposure steps for which the alignment is carried out by the off-axis automatic alignment system, such an exposure step for printing an actual circuit pattern onto the wafer requires an accurate alignment, so that a positional accuracy of an order of 0.1 micron is necessary for the stoppage at the end of each stepwise movement of the wafer stage. On the other hand, only a relatively loose tolerance of an order of 0.5–1.0 micron is sufficient for such an exposure step for printing an aluminum wiring pattern onto the wafer.

The drive control system acording to this embodiment has a structure substantially the same as that of the first embodiment. Like the first embodiment, the drive control system of the present embodiment includes a similar main control circuit such as shown at 26 in FIG. 3. Major functions of the main control circuit of the present embodiment are as follows:

(1) To supply the driving circuit 22, on the basis of the output from the position comparator 27, with an instruction signal in accordance with either the position controlling mode or speed controlling mode;

(2) To detect, on the basis of the output signal from the discriminator 29, whether or not the stage has come within the tolerance of the target position, and to stop the drive of the wafer stage when it comes within the tolerance;

(3) To control the driving circuit 22, on the basis of the output from the comparator 33, to control the drive of the motor 7 so that the output of the detector 31 becomes equal to the output of the setting circuit 32;

(4) To set a target value in each of the target position setting circuit 25 and the target speed setting circuit 32; and (5) To set in the tolerance setting circuit 28 an appropriate tolerance in accordance with a required accuracy corresponding to the kinds of the patterns to be printed onto the wafer (this is one of the distinctive features of this embodiment).

As described, the structure of the drive control system of this embodiment is substantially the same as that of the first embodiment. So, description of the operation of the present embodiment will first be made on the basis of the disclosure of FIG. 3. The main control circuit such as shown at 26 in FIG. 3 is connected to an input/output device 20 having a CRT display, a keyboard, etc. By manually handling this input/output device 20, an operator manually inputs to the apparatus various data concerning the kind of operation such as the first-mask step, the alignment step, etc., the tolerance of the positional accuracy for the stoppage of the stage 6 and the like.

The control of the drive of the stage 6 for the exposure operation will be described. With regard to the step-and-repeat operation, the main control circuit 26 specifies a target position (the shot position to which the stage 6 is to be moved) and sets the target position in the target position setting circuit 25. Simultaneously therewith, the main control circuit 26 supplies the driving circuit 22 with an instruction signal based on the speed controlling mode. After the movement of the X-Y stage 6 is initiated, the main control circuit 26 outputs, in accordance with an appropriate one of acceleration/deceleration tables prepared therein, set values designating a particular speed variation pattern of substantially trapezoidal shape such as, for example, shown in the period SS in FIG. 1. These set values are applied in sequence to the target speed setting circuit 32 at a constant timing. Then, in the speed comparator 33, the set values as applied to the target speed setting circuit 32 are compared in sequence with the outputs of the tachogenerator 30 as detected by the current speed detector 31, to thereby control the driving speed of the motor 7 by way of the driving circuit 22. During such operation of the speed controlling servo system, the outputs of the position comparator 27 are monitored by the main control circuit 26 and, when the output value of the position comparator 27 becomes equal to a predetermined set value, e.g. a value representing the position of 20 microns, the main control circuit 26 applies to the driving circuit 22 an instruction signal for effecting the position control in place of the speed control.

In the position control mode, the output of the position comparator 27 and the output of the tolerance setting circuit 28 are compared with each other in the discriminator 29.

If the magnitude of the output from the position comparator 27 is greater than that of the output from the tolerance setting circuit 28, the main control circuit 26 still acts on the driving circuit 22 to continue the position control. If, on the other hand, the magnitude of the output from the position comparator 27 becomes less than that of the output from the tolerance setting circuit 28, the discriminator 29 produces a positioning completion signal which is applied to the main control circuit 26. By this, an instruction signal for instructing stoppage of the motor 7 is applied to the driving circuit 22 and the control operation is terminated.

In such case, the main control circuit 26 selectively applies to the tolerance setting circuit 28 an instruction signal for setting a relatively wider tolerance of an order of 0.5–1.0 micron, for example, with respect to the exposure step for printing the wiring pattern, and an instruction signal for setting a small tolerance of an order of 0.1 micron, for example, with respect to the exposure step for printing the actual circuit pattern onto the wafer.

Figure 10:
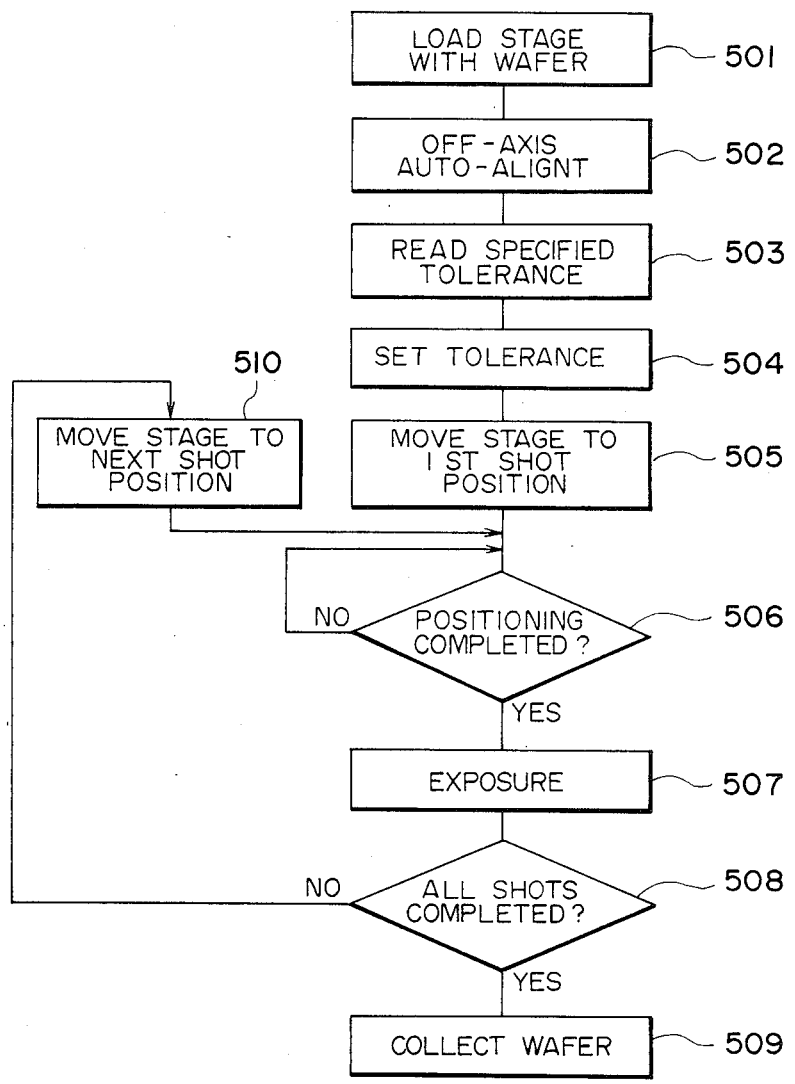
FIG. 10 is a flow chart showing the operation of the drive control system according to the fifth embodiment of the present invention.

FIG. 10 is a flow chart showing the operation of the drive control system according to this embodiment of the present invention, in which the positional accuracy for the stoppage of the stage is variably set by the main control circuit 26.

First, at Step 501, the wafer 4 is placed on the stage 6. Then, at Step 502, the off-axis automatic alignment is carried out by the off-axis alignment optical system. By this automatic alignment, the position of the wafer 4 held by the stage 6 is detected. In the case of the exposure operation following the off-axis automatic alignment, the stage 6 is first moved on the basis of the positional information obtained by the off-axis automatic alignment and in accordance with the positional information of the stage as detected by the laser interferometers 216x and 216y. The stepwise movement of the stage 6 after the initial positioning thereof is controlled, for each of the shots, by counting the pulses from the laser interferometers designating the current position of the stage.

In this embodiment of the present invention, the microprocessor contained in the main control circuit 26 reads out the necessary alignment accuracy as specified in the input/output device 20 (Step 503) and sets the tolerance in the tolerance setting circuit 28 (Step 504).

In such case, a relatively wide tolerance is inputted for such exposure step in which a relatively loose alignment accuracy is permissible. This is effective to reduce the time required for the control of the drive of the stage 6, which leads to an increase in the throughput.

After the tolerance is set in the tolerance setting circuit, the stage 6 is moved to the first shot position (Step 505) and, if it is discriminated that the stage 6 is stopped at a position within the tolerance (Step 506), the sequence proceeds to Step 507 so that the exposure is effected in a predetermined manner. Then, at Step 508, whether or not all the shots are completed is discriminated. If not completed, then the sequence proceeds to Step 510, so that the stage 6 is moved to the next shot position and the operations at Steps 506–508 are repeated. If the result of discrimination at Step 508 shows that the exposures of all the shots are completed, the sequence proceeds to Step 509 at which the wafer 4 is collected by a collecting device, whereby one exposure step for one complete wafer is accomplished.

As for the setting of the tolerance, a strict tolerance may be set with respect to the exposure operation which will be first effected relative to the wafer to achieve higher positional accuracy, while a relatively wide tolerance may be set, establishing a relatively loose positional accuracy, with respect to the exposure operation relative to the second layer, the third layer and so on, of the wafer in which alignment marks formed by the preceding exposure step can be used in the off-axis alignment. This is effective to further decrease the time required for the control of the stepwise movement of the stage.

Also, the tolerance may be directly inputted to the input/output device 20 or, alternatively, the data on the kind of the exposure step may be inputted into the input/output device 20. In the latter case, the tolerance corresponding to the inputted data is automatically set.

While, in the foregoing embodiments, the invention has been described with reference to integrated circuit manufacturing exposure apparatuses, this is not limiting. For example, the drive control system of the present invention is applicable also to wafer examining apparatuses or other wafer conveying apparatuses.

While the invention has been described with reference to the structures disclosed herein, it is not confined to the details set forth and this application is intended to cover such modifications or changes as may come within the purposes of the improvements or the scope of the following claims.

What is claimed is:

1. A system for controlling a drive of a movable member for carrying a workpiece, said system comprising:
    first servo control means for moving the workpiece carrying member at a relatively high speed and for stopping the workpiece carrying member with a relatively low positional accuracy relative to a target position;
    second servo control means for moving the workpiece carrying member at a relatively low speed and for stopping the workpiece carrying member with a relatively high positional accuracy relative to the target position; and
    means for selecting one of or a combination of said first and second servo control means in accordance with the positional accuracy required of the workpiece carrying member with respect to the target position;
    wherein said first servo control means includes means for setting the desired moving speed of the workpiece carrying member in accordance with a speed pattern that is substantially trapezoidal in shape, and wherein said first servo control means further includes means for controlling the moving speed of the workpiece carrying member in accordance with the speed pattern set by said setting means.

2. A system for controlling a drive of a movable member for carrying a workpiece, said system comprising:
    first servo control means effective for moving the workpiece carrying member at a relatively high speed and for stopping the workpiece carrying member with a relatively low positional accuracy relative to a target position;
    second servo control means effective for moving the workpiece carrying member at a relatively low speed and for stopping the workpiece carrying member with a relatively high positional accuracy relative to the target position; and
    means for selecting one of or a combination of said first and second servo control means in accordance with the positional accuracy required of the workpiece carrying member with respect to the target position;
    wherein said first servo control system comprises means for detecting a moving speed of the workpiece carrying member and means for controlling the moving speed, acceleration and deceleration of the workpiece carrying member in response to an output of said moving speed detecting means.

3. A system according to claim 2, wherein said moving speed detecting means comprises a tachogenerator connected to a motor for driving the workpiece carrying member.

4. A system according to claim 1, wherein said second servo control system comprises means for detecting a position of the workpiece carrying member and means for controlling a stop position of the workpiece carrying member on the basis of an output from said position detecting means.

5. A system according to claim 4, wherein said position detecting means comprises an optical scale.

6. A system according to claim 4, wherein said position detecting means comprises a laser interferometer.

7. A system according to claim 1, wherein the workpiece carrying member has at least a first position at which the workpiece is to be fed to and/or from the workpiece carrying member, a second position at which the workpiece is to be placed with a relatively low positional accuracy and a third position at which the workpiece is to be placed with a relatively high positional accuracy and wherein said selecting means selects said first servo control means when the target position of the workpiece carrying member is at the first or second position, while said selecting means first selects said first servo control means and then selects said second servo control means, when the target position of the workpiece carrying member is at the third position, said selecting means selecting said second servo control means when the workpiece carrying member reaches a predetermined position in proximity to the third position.

8. A system for controlling a drive of a movable member for carrying a workpiece, said system comprising:
    first servo control means for moving the workpiece carrying member at a relatively high speed and for stopping the workpiece carrying member with a relatively low positional accuracy relative to a target position;
    second servo control means for moving the workpiece carrying member at a relatively low speed and for stopping the workpiece carrying member with a relatively high positional accuracy relative to the target position; and
    means for selecting one of or a combination of said first and second servo control means in accordance with a kind of process to be effected relative to the workpiece.

9. A system according to claim 8, wherein said first servo control system comprises means for detecting a moving speed of the workpiece carrying member and means for controlling the moving speed, acceleration and deceleration of the workpiece carrying member in response to an output of said moving speed detecting means.

10. A system according to claim 9, wherein said moving speed detecting means comprises a tachogenerator connected to a motor for driving the workpiece carrying member.

11. A system according to claim 8, wherein said second servo control system comprises means for detecting a position of the workpiece carrying member and means for controlling a stop position of the workpiece carrying member on the basis of an output from said position detecting means.

12. A system according to claim 11, wherein said position detecting means comprises an optical scale.

13. A system according to claim 11, wherein said position detecting means comprises a laser interferometer.

14. A system according to claim 8, wherein the workpiece is a semiconductor wafer which is to be subjected to plural exposure steps in sequence, wherein said selecting means selects said first servo control means when the exposure step to be effected relative to the workpiece is other than a first exposure step and wherein said selecting means first selects said first servo control means and then selects said second servo control means, when the exposure step to be effected relative to the workpiece is the first exposure step, said selecting means selecting said second servo control means when the workpiece carrying member reaches a predetermined position in proximity to the target position.

15. A system for controlling a drive of a movable member for carrying a workpiece, said system comprising:
means for controlling a stopping position of the workpiece carrying member with a predetermined positional tolerance relative to a target position at which the workpiece carrying member is to be placed; and
means for variably setting the predetermined positional tolerance of the stopping position of the workpiece carrying member relative to the target position.

16. A system according to claim 15, wherein said controlling means comprises means for detecting a position of the workpiece carrying member and means for controlling, on the basis of an output of said position detecting means, the position of the workpiece carrying member to control the stopping position of the workpiece carrying member.

17. A system according to claim 16, wherein said position detecting means comprises an optical scale.

18. A system according to claim 16, wherein said position detecting means comprises a laser interferometer.

19. A system according to claim 15, wherein said workpiece carrying member has at least a first position at which the workpiece is to be fed to and/or from the workpiece carrying member, a second position at which the workpiece is to be placed with a relatively low positional accuracy and a third position at which the workpiece is to be placed with a relatively high positional accuracy and wherein said variably setting means sets a relatively narrow tolerance when the target position is at the third position, as compared with the tolerance to be set by said variably setting means when the target position is at the first or second position.

20. A system for controlling a drive of a stage for carrying a wafer, for use in an integrated circuit manufacturing exposure apparatus including aligning means for moving the wafer and a reticle relative to each other so as to bring them into alignment, said system comprising:
means for controlling a stopping position of the stage carrying the wafer with a predetermined positional tolerance; and
means for variably setting the predetermined positional tolerance of the stopping position of the stage, said variably setting means adapted to set a different positional tolerance with respect to a first exposure step to be effected relative to the wafer, as compared with a positional tolerance to be set by said variably setting means with respect to a second exposure step in which the exposure of the wafer is effected after completion of the alignment between the wafer and the reticle by the aligning means.

21. A system according to claim 20, wherein the aligning means comprises a through the lens alignment system.

22. A system according to claim 20, wherein said variably setting means is adapted to set a relatively wide positional tolerance with respect to movement of the stage during the second exposure step, as compared with the positional tolerance set by said variably setting means for the movement of the stage during the first exposure step.

23. A system according to claim 20, wherein said controlling means includes means for detecting a position of the stage and means for controlling, on the basis of an output from said position detecting means, the position of the stage to control the stopping position of the stage.

24. A system according to claim 23, wherein said position detecting means comprises an optical scale.

25. A system according to claim 23, wherein said position detecting means comprises a laser interferometer.

26. A system for controlling a drive of a stage for carrying a wafer, for use in an integrated circuit manufacturing exposure apparatus including aligning means for moving the wafer and a reticle relative to each other so as to bring them into alignment prior to initiation of a first movement of the stage, said system comprising:
means for controlling a stopping position of the stage carrying the wafer with a predetermined positional tolerance; and
means for variably setting the predetermined positional tolerance of the stopping position of the stage;
wherein, with respect to a particular exposure step of a plurality of exposure steps to be made relative to the same region of the wafer, said variably setting means is adapted to set a positional tolerance for the particular exposure step different from the positional tolerances set by said variably setting means with respect to the other exposure steps.

27. A system according to claim 26, wherein the aligning means comprises an off-axis alignment system.

28. A system according to claim 26, wherein said particular exposure step is an exposure step for printing a wiring pattern onto the wafer and wherein the positional tolerance set by said variably setting means with respect to said particular exposure step is wider than the positional tolerances set by said variably setting means with respect to the other exposure steps.

29. A system according to claim 26, wherein said controlling means includes means for detecting a position of the stage and means for controlling, on the basis of an output from said position detecting means, the position of the stage to control the stopping position of the stage.

30. A system according to claim 29, wherein said position detecting means comprises an optical scale.

31. A system according to claim 29, wherein said position detecting means comprises a laser interferometer.

32. A method of controlling a drive of a stage for carrying a wafer, comprising the steps of:
placing the wafer on the stage;
moving the stage with a first servo control that is capable of moving the stage at a relatively high speed and stopping the stage with a relatively low positional accuracy relative to a stopping position;
moving the stage with a second servo control that is capable of moving the stage at a relatively low speed and stopping the stage with a relatively high positional accuracy relative to a stopping position; and
selecting one of or a combination of the first and second servo-controlled movements in accordance with the positional accuracy required with respect to a target position of the stage;
wherein the step of moving the stage with the first servo control includes setting the desired moving speed of the stage in accordance with a speed pattern that is substantially trapezoidal in shape, and controlling the moving speed of the stage in accordance with the speed pattern.

33. A method according to claim 32, wherein said selecting step includes selection of the target position of the stage.

34. A method according to claim 32, wherein said selecting step includes selection of an integrated circuit manufacturing step.

35. A method of controlling a drive of a stage for carrying a wafer for manufacturing an integrated circuit, said method comprising the steps of:
placing the wafer on the stage; and
selecting in sequence plural positional tolerances for a positional accuracy of a stopping position of the stage.

36. A method according to claim 35, wherein said selecting step includes selection of a target position of the stage.

37. A method according to claim 35, wherein said selecting step includes selection of an integrated circuit manufacturing step.

38. A system for controlling a drive of a movable member for carrying a workpiece, said system comprising:
first servo control means for moving the workpiece carrying member at a relatively high speed and for stopping the workpiece with a relatively low positional accuracy relative to a target position;
second servo control means for moving the workpiece carrying member at a relatively low speed and for stopping the workpiece carrying member with a relatively high positional accuracy relative to the target position; and
means for selecting one of or a combination of said first and second servo control means in accordance with a kind of process to be effected relative to the workpiece;
wherein said first servo control means includes means for setting the desired moving speed of the workpiece carrying member in accordance with a speed pattern that is substantially trapezoidal in shape, and wherein said first servo control means further includes means for controlling the moving speed of the workpiece carrying member in accordance with the speed pattern set by said setting means.

* * * * *